Figure 1:
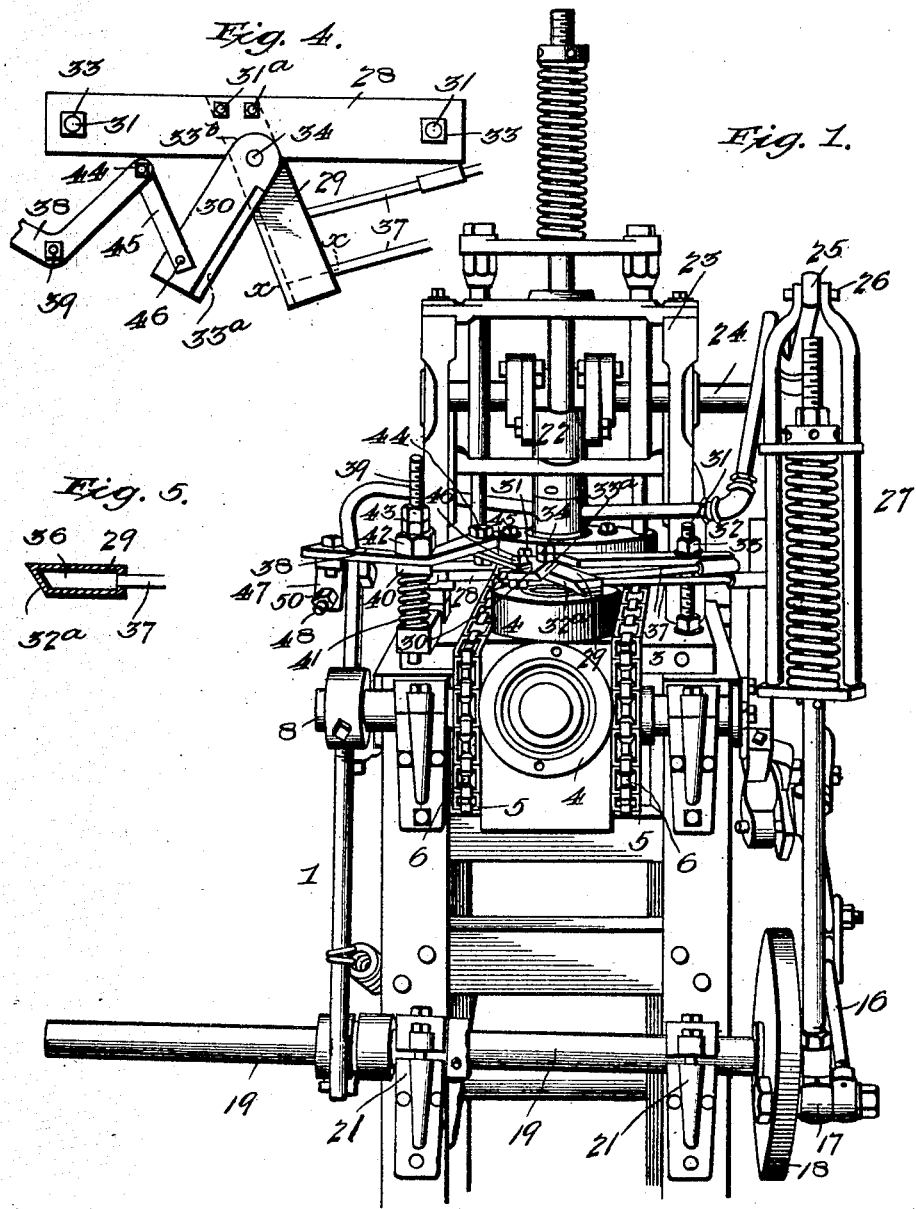

No. 860,293. PATENTED JULY 16, 1907.
E. J. HAYES.
GLASS PRESS.
APPLICATION FILED OCT. 20, 1906.

3 SHEETS—SHEET 1.

Witnesses
T. L. Cochrane
R. C. Braddock.

Inventor
Edward J. Hayes.
By D. T. Wolhaupter
Attorney

No. 860,293. PATENTED JULY 16, 1907.
E. J. HAYES.
GLASS PRESS.
APPLICATION FILED OCT. 20, 1906.

3 SHEETS—SHEET 2.

Witnesses
T. L. Mockane
R. C. Braddock.

Inventor
Edward J. Hayes
By D. T. Wolhaupter
Attorney

No. 860,293. PATENTED JULY 16, 1907.
E. J. HAYES.
GLASS PRESS.
APPLICATION FILED OCT. 20, 1906.
3 SHEETS—SHEET 3.
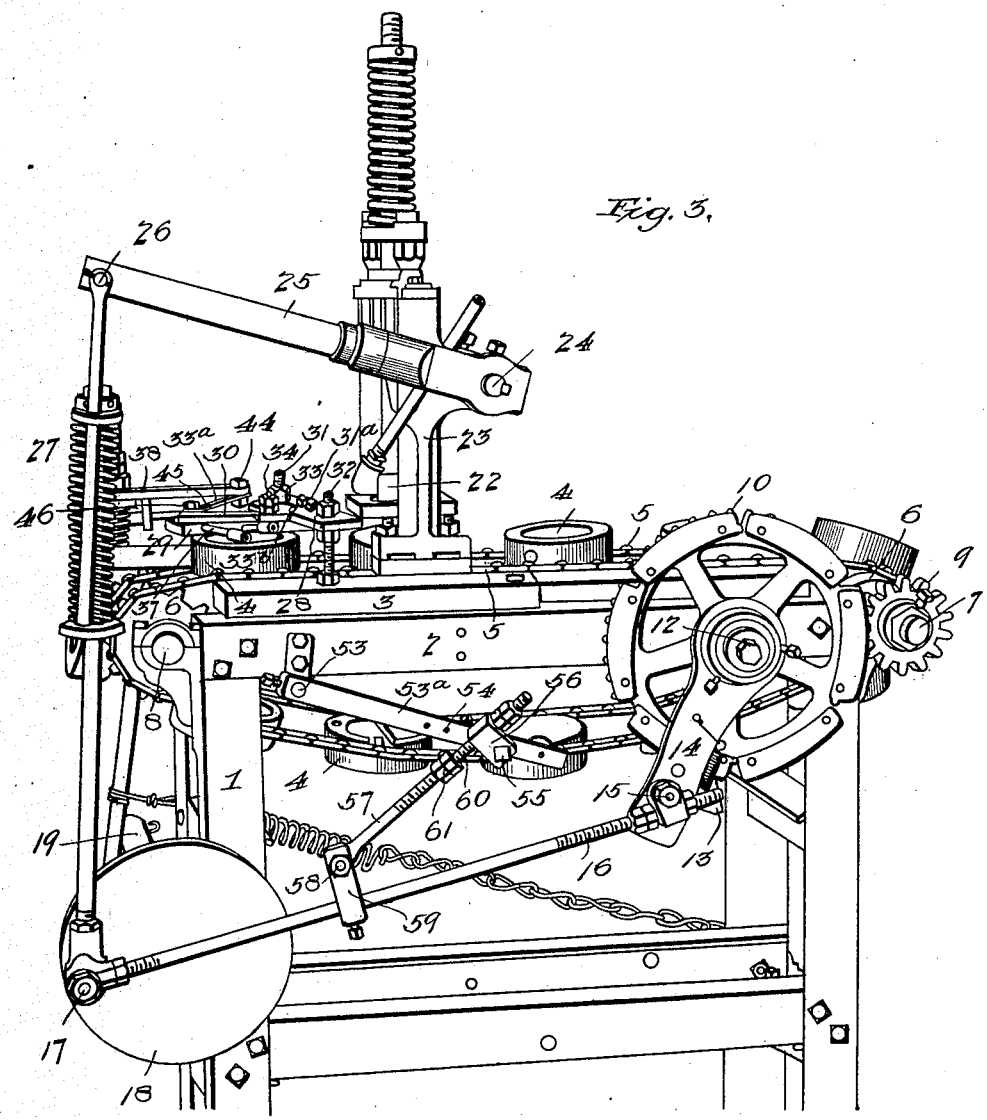
Witnesses
T. L. Cochrane
R. C. Braddock
Inventor
Edward J. Hayes
By D. T. Wolhaupter
Attorney

UNITED STATES PATENT OFFICE.

EDWARD J. HAYES, OF MARION, INDIANA.

GLASS-PRESS.

No. 860,293.   Specification of Letters Patent.   Patented July 16, 1907.

Application filed October 20, 1906. Serial No. 339,863.

*To all whom it may concern:*

Be it known that I, EDWARD J. HAYES, a citizen of the United States, residing at Marion, in the county of Grant and State of Indiana, have invented certain new and useful Improvements in Glass-Presses, of which the following is a specification.

This invention relates to certain improvements in presses for the manufacture of glassware and more particularly an improved cut-off or shearing device for cutting or releasing the plastic glass in the operation of filling the molds.

To this end the invention has in view a simple and practical construction of cut-off attachment possessing special utility as a shearing mechanism for that type of glass presses embodying in its general organization a series of traveling molds and a reciprocal pressing plunger coöperating therewith, to provide for automatically cutting off the glass from the gathering iron while a mold is in its proper feeding position before passing beneath the plunger.

A further object of the invention is to provide an improved operating mechanism for the shearing blades of the cut-off whereby such mechanism will not only provide for the automatic opening, closing and stopping of the shears, but is also capable of a nicety of adjustment to regulate both the speed and leverage of the shear action to suit the exact operating conditions of the press, thereby providing an effective combination in a glass press wherein the several operations of cutting the glass from the gathering rod, pressing the glass in the mold, and carrying the completed article from the plunger, may be automatically effected in due and proper succession.

With these and many other objects in view which will more readily appear as the nature of the invention is better understood, the same consists in the novel construction, combination, and arrangement of parts hereinafter more fully described, illustrated, and claimed.

Figure 2:
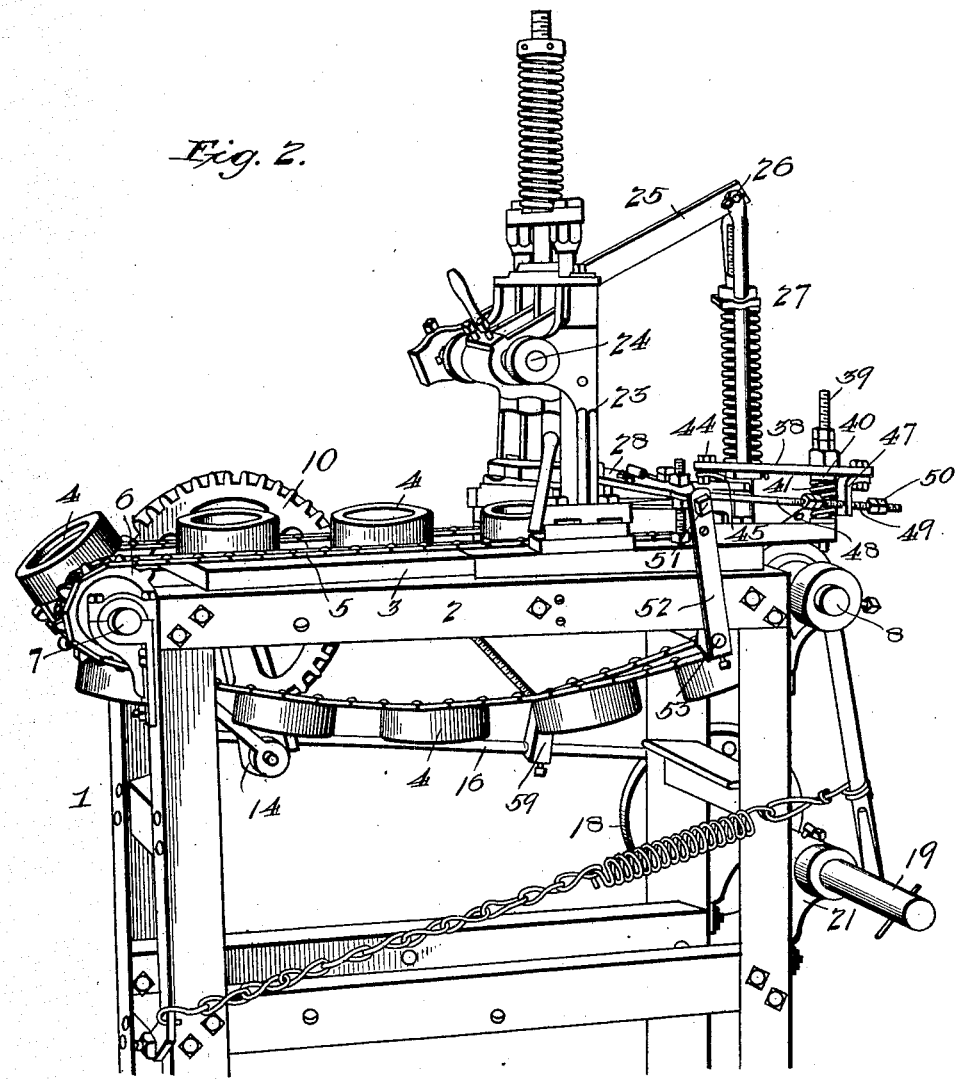

The essential features of the invention involved in carrying out the objects above indicated, are necessarily susceptible to a wide range of structural modification without departing from the scope thereof, but a perferred embodiment of the latter is shown in the accompanying drawings, in which:

Figure 1 is a front perspective view of a glass press equipped with the improved cut-off attachment whose shearing members or blades are arranged at the feeding-in side of the press in a plane above the molds. Fig. 2 is a perspective view of the press from one side thereof. Fig. 3 is a perspective view of the press, illustrating the side opposite to that shown in Fig. 2. Fig. 4 is a detail plan view of the shearing mechanism proper of the cut-off attachment, illustrating the mounting of the shear blades and the parts associated therewith. Fig. 5 is a detail sectional view on the line 5—5 of Fig. 4 showing the hollow formation of one of the shear blades to provide an interior cooling chamber therefor.

Like references designate corresponding parts in the several figures of the drawings.

As indicated above, the improved cut-off attachment contemplated by the present invention is of special utility when employed in connection with that of glass presses disclosed in my Patent No. 835,613, dated November 13, 1906, so for illustrative purposes to best show the construction, mounting and action of the cut-off attachment, the latter is illustrated in the drawings in connection with a press having substantially the features and actions of the press disclosed in the patent aforesaid. Referring particularly to these drawings, the numeral 1 designates a machine stand having a horizontal top portion 2 within which is arranged the horizontal molding table 3. This table has associated therewith an endless mold carrier essentially consisting of an endless belt of mold cups 4 traveling above and below the table and suitably connected to and carried with a pair of opposite parallel carrier chains 5. The said open mold cups 4 preserve the same general arrangement as is common in the endless chain mold type of glass presses, that is, being disposed in regularly spaced relation and swung between the chains, so that as the carrier is set in motion the molds are carried in upright active position over the upper side of the molding table 3 to receive therein from the gathering iron the supply of glass to be pressed in shape from the action of the plunger.

The chains 5 of the mold carrier pass over the usual sprocket wheels or pulleys 6 located at opposite ends of the top portion 2 of the machine stand, and mounted respectively on the oppositely located carrier shafts 7 and 8.

In the type of press shown in the drawings, the feeding of the endless traveling mold carrier 4—5 is effected through the medium of a power operating mechanism including a driven pinion 9 mounted on one end of the carrier shaft 7 and meshing with a ratchet spur gear 10 having a journal support 12 at one side of the machine stand and rotated under the influence of a spring-held propelling dog 13 carried by a swinging ratchet arm 14 swung at one end from the axis or journal support 12 of the spur gear 10. The ratchet arm 14 has suitably connected therewith, as at 15, one end of a reciprocating operating rod 16 whose opposite end has a wrist pin connection 17 with a driving crank wheel 18 mounted on one end of a drive shaft 19 journaled in suitable bearings 21 fitted to one end of the machine stand, said drive shaft receiving its motion by a suitable belt connection (not shown) with a power motor or engine.

When a mold cup is supplied with glass from the gathering iron the same passes to a position beneath a reciprocating pressing plunger 22 arranged for support and operation within the usual upright guide frame 23 surmounting the top portion 3 of the machine stand and overhanging the molding table. The relation and action of the plunger 22 and its coacting parts are well understood by those familiar with the art, and the present invention involves no change therein, but it may be noted that the plunger operating mechanism includes a rocker shaft 24 journaled in suitable bearings provided at one side of the standards of the guide frame 23 and having fitted to one end thereof an operating lever 25, to one end of which lever, as at 26 is connected the upper end of a compensating pitman 27, the lower end of which pitman is pivotally connected by the wrist pin connection 17 to the driving crank wheel 18, thereby completing a line of power connections which provide for operating from a single shaft or wheel both the endless mold carrier and the plunger operating mechanism.

These features are covered in my patent aforesaid, but the present invention also contemplates automatically controlling and actuating a cut-off attachment from the same power shaft or wheel. This cut-off attachment, and its combinations, constitute the subject matter of the present application and include in their organization what may be characterized as a shearing mechanism and an operating device for such mechanism. The said shearing mechanism is designed to be arranged at the feeding-in side of the press above the plane of the molds passing over the upper side of the molding table 3 and at one side of the vertical plane of the guide frame 23 for the pressing plunger 22. The said shearing mechanism essentially consists of a horizontal vertically adjustable shear support 28 and a pair of shear blades 29 and 30 respectively. The shear support 28 preferably consists of a horizontal bar arranged transversely of the molding table and having its end portions fitted over the upright holding standards 31. These standards are preferably provided with threaded portions 32 receiving thereon the clamping nuts 33 arranged above and below the end portions of the bar or support 28, and providing means in conjunction with the said threaded portions of the standard for accurately adjusting the shear support to a proper position and clamping it firmly therein.

The coöperating shear blades 29 and 30 project forwardly from the support or supporting bar 28 and one of said blades, designated by the number 29, is stationary and constitutes the ledger blade, while the other of the same, designated by the number 30 is a movable or pivotal blade, and is designed to be swung toward and from the fixed blade 29 in the shearing action. The fixed or stationary blade 29 of the shearing mechanism is set obliquely to the line of travel of the molds and is preferably secured at what may be termed its inner end to the supporting bar 28 through the medium of bolts or equivalent fastenings 31ª to provide means for rigidly securing the fixed blade to the supporting bar while at the same time permitting it to be readily removed for purposes of repair or replacement. The said obliquely set fixed shear blade 29 is provided at one edge with a beveled cutting edge 32ª coöperating with a corresponding complemental beveled cutting edge 33ª provided along one edge of the movable or pivoted shear blade 30 which is pivotally mounted at its inner end, as at 34, upon the upper side of the fixed blade 29. The pivoted end of the blade 30 is arranged to register and work in a rounded guiding and bracing notch 33ᵇ formed in the outer or front edge of the shear support or supporting bar 28, as best shown in Fig. 4 of the drawings. This construction provides for a strong and adjustable mounting of the shearing mechanism proper, and at this point it may be noted that in carrying out the invention it is preferable to make the fixed shear blade 29 of a hollow formation so as to provide therein an interior cooling chamber 36 within which water is circulated through the medium of a pair of water circulating pipes 37 suitably fitted to the blade 29 and arranged to communicate with the chamber 36. This provides means for maintaining the shears at an effective temperature for maintaining the proper operation thereof, and obviating the quick impairment of the same by the heat of the plastic glass.

The operating device of the cut-off attachment, which provides for automatically operating the movable or pivoted blade 30 of the bearing mechanism, includes a horizontal operating bell crank lever 38 mounted at its angle upon a pivot post 39 conveniently arranged on one corner of the machine stand, and preferably accommodating thereon a slidable tension collar 40 frictionally held against the under side of the lever 38 by the pressure of a pressure spring 41 arranged beneath the collar and exerting an upward pressure thereon. Above the lever 38 the pivot post 39 is threaded and accommodates thereon the holding and jam nuts 42 and 43 respectively, which provide for holding and locking the bell crank lever against upward movement, while at the same time not interfering with the oscillation thereof. Through the adjustment of the nuts 42 and 43 the tension of the spring 41 may be increased or diminished and thereby regulate the ease of movement of the shearing mechanism.

The inner end of the bell crank lever 38 has pivotally connected thereto, as at 44, one end of a throw link 45, the other end of which is pivoted, as at 46, to the outer end portion of the pivoted blade 30, thereby providing a connection wherein the movement of the lever 38 secures a movement or swing of the pivoted shear blade 30.

The outer end of the bell crank lever 38 has attached thereto a pendent strike lug 47 through which slides a connecting rod 48 having a threaded section 49 carrying adjustable tappet nuts 50 located respectively upon opposite sides of the lug, and upon engagement therewith providing for swinging the bell crank lever 38. The adjustment of the nuts 50 provides for regulating the throw of the bell crank lever.

The connecting rod 48 is pivotally and adjustably connected, as at 51, to the upper end of a rock arm 52, the lower end of which is made fast to one end of a rock shaft 53 journaled transversely of the machine stand beneath the top portion 2 thereof, and having connected to its opposite end, at the opposite side of the stand, one end of a lever arm 53ª. This lever arm is provided with a series of adjustment holes 54 for receiving the bolt 55 for a connecting clip 56 through which slides a pitman 57 pivotally connected at 58 to a rod clamp 59 adjustably clamped upon the operating rod 16 for the ratchet mechanism of the spur wheel 10. The pitman 57 is provided with a threaded section 60 upon which is adjustably mounted the oppositely arranged tappet nuts 61, which, in conjunction with the similar nuts 50 of the connecting rod 48, not only provide for regulating the stroke of the shearing mechanism, but also provide means whereby the same may be timed accurately to operate at the proper moment as the molds are first arrested in their movement and then carried along.

In the operation of the press, it will be understood that the gatherer usually gathers enough glass to make three or four articles and then holds the same over the mold to permit the plastic glass to run into the same by gravity until it has been stretched down sufficiently to cut-off enough for one article. When this occurs, the shearing mechanism atomatically closes, thereby cutting off the projected hot glass, which is then carried with the mold beneath the plunger for the pressing operation.

From the foregoing it is thought that the construction, operation, and advantages of the herein described cut-off attachment will be readily apparent without further description.

I claim:

1. In a glass press, the combination with the traveling molds and plunger, and the operating mechanism therefor, of a cut-off attachment comprising a pair of shears consisting of a fixed and a movable shear blade arranged horizontally above the plane of the molds, a lever having a link connection at one end with the movable shear blade, a rock shaft carrying at one end a rock arm and at its other end a lever arm, a tappet connection between said rock arm and the said lever, and a pitman having a tappet connection with said lever arm and operatively connected with the operating mechanism for the molds and plunger.

2. In a glass press, the combination with the traveling molds and plunger, and the operating mechanism therefor, of a cut-off attachment comprising a pair of shears consisting of a fixed and a movable shear blade arranged horizontally above the plane of the molds at one side of the plunger, an adjustably-mounted pressure-held bell crank lever having a link connection at one end with the movable shear blade and at its other end provided with a strike lug, a suitably supported rock shaft carrying at one end a rock arm and at its other end a lever arm, a connecting rod connected with said rock arm and sliding through the strike lug of the bell crank lever, said connecting rod carrying adjustable tappet lugs arranged upon opposite sides of the strike lug, and a pitman having an adjustable tappet connection with said lever arm and operatively connected with an element of the operating mechanism for the molds and plunger.

3. In a glass press, the combination with a molding table and travel molds working thereover, of a cut-off attachment comprising a horizontally vertically adjustable supporting bar arranged transversely above the molding table, a pair of shears consisting of a fixed shear blade fastened to the supporting bar and projecting therefrom obliquely to the plane of movement of the molds, a movable shear blade pivotally mounted on the fixed blade, and operating connections with said movable blade.

In testimony whereof I hereunto affix my signature in the presence of two witnesses.

EDWARD J. HAYES.

Witnesses:
H. A. MOCKAY,
GEORGE S. HARTER.